April 14, 1959   D. C. BROADBENT ET AL   2,882,105
BEARING ASSEMBLIES FOR SUPPORTING ROTARY SHAFTS
Filed March 20, 1956   2 Sheets-Sheet 1
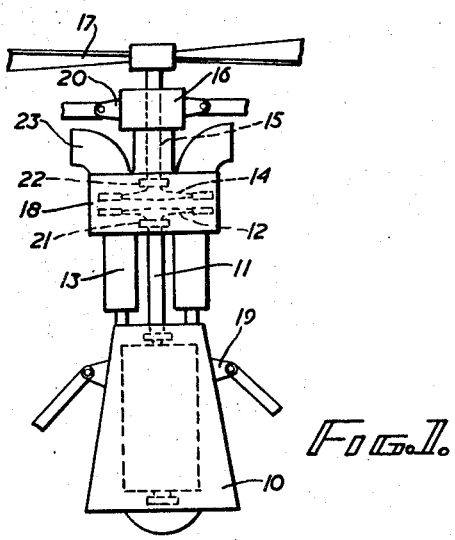
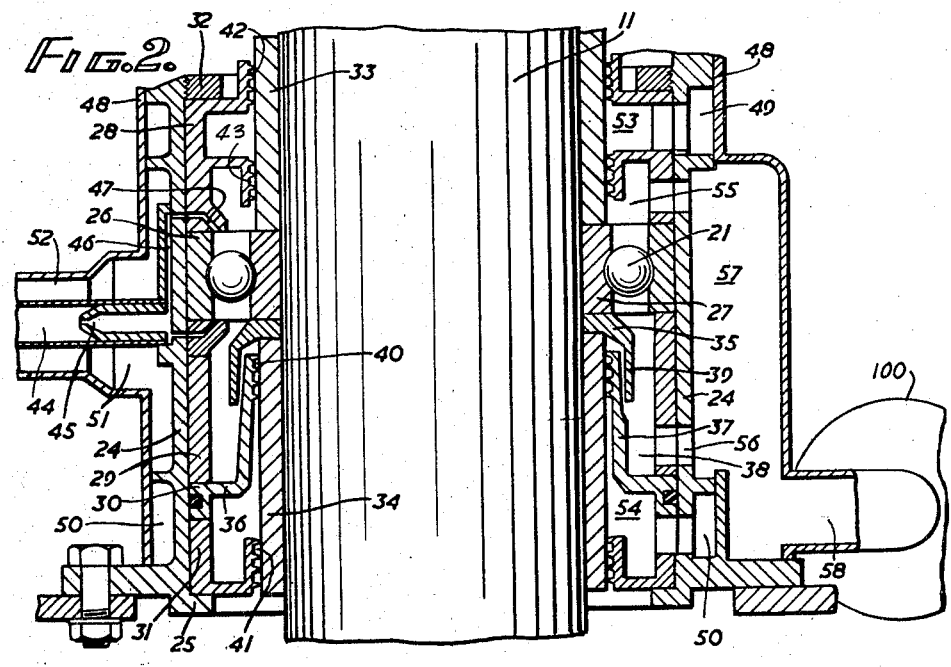
INVENTORS
DAVID C. BROADBENT
JACK V. BLYTH
BY Watson, Cole, Grindle & Watson  ATTORNEYS

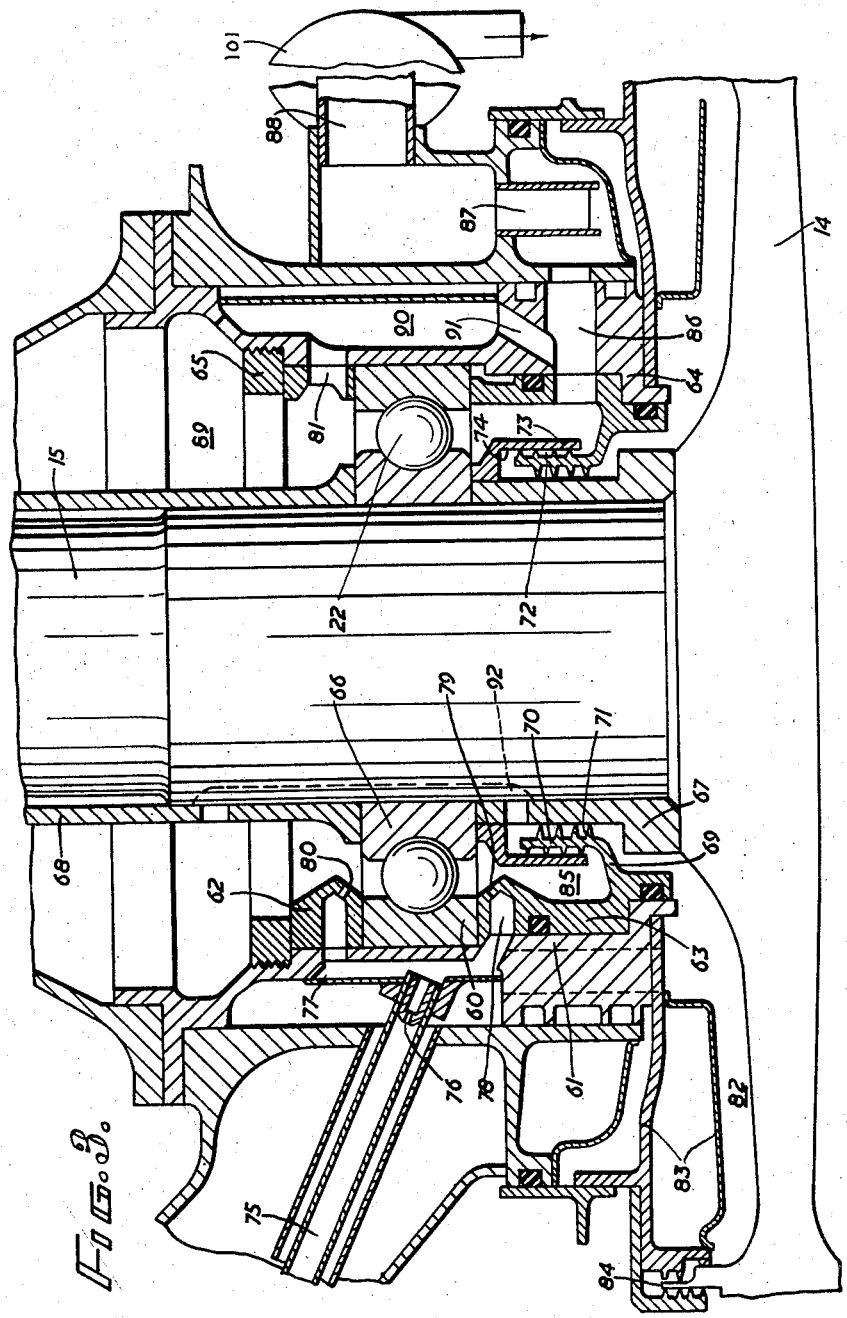

2,882,105

BEARING ASSEMBLIES FOR SUPPORTING ROTARY SHAFTS

David Charles Broadbent, Pinner, and Jack Vallis Blyth, Ewell, England, assignors to D. Napier & Son Limited, London, England, a British company Application March 20, 1956, Serial No. 572,744

Claims priority, application Great Britain March 25, 1955

9 Claims. (Cl. 308—187)

This invention relates to bearing assemblies for supporting rotary shafts, the axes of which are approximately vertical, and has for its object the provision of an assembly which will enable adequate lubrication of the bearing or bearings incorporated in such assembly to be achieved while preventing any substantial escape of oil downwards from the assembly.

The invention is particularly, but not exclusively, applicable to bearing assemblies for supporting the shafts of combustion turbine power units intended to be arranged with their axes vertical, for example with the compressor at the lower end of the unit and the turbine or turbines and the interposed combustion chamber or series of combustion chambers above the compressor, and with or without a reduction gear casing disposed above the turbine or turbines to receive power from the unit and transmit it to the rotor of a helicopter.

According to the present invention a bearing assembly for supporting a shaft having a substantially vertical axis comprises a tubular bearing housing through which the shaft passes leaving an annular space between the shaft and the housing, a ball or roller bearing lying in the annular space with the outer race of the bearing located in the housing and the inner race of the bearing located on the shaft, an annular trough attached to the housing below the bearing and extending inwardly towards the shaft but with its inner side wall spaced from the shaft by a clearance, an inverted cup member attached to the shaft below the bearing with its downwardly extending side wall overlapping the said inner side wall of the trough with a clearance between them, which clearances provide the only communication between the parts of the said annular space respectively above and below the trough and inverted cup member, means for delivering oil to the bearing, means for causing a gas (usually air) to pass from the lower part of the said annular space into the upper part thereof through the said clearances in series at least one of which is of such small radial dimension that oil and gas cannot both flow through it in opposite directions, and a passage leading from the trough and connected with a suction-producing device for drawing off oil and gas from the trough.

The said clearances in series provide the only possible leakage path for oil from the bearing down the shaft. Since gas is caused to flow through these clearances in the opposite direction to that in which oil would tend to leak and since at least one of these clearances is so small that oil and gas cannot both flow through it in opposite directions, such leakage is effectively prevented. Conveniently, at least one, and preferably both, of the said clearances is of labyrinth form.

There will be present in the trough both gas and oil, usually mixed together in the form of a mist or froth. It is this mixture that is drawn off by the suction-producing device, for instance a scavenge pump.

The inner and outer races of the bearing may be located on the shaft and in the tubular housing, respectively, in any suitable manner. Conveniently each is located by upper and lower locating sleeves fixed to the shaft or to the housing as the case may be. Since these sleeves are respectively fixed to the housing and to the shaft, they can be considered as parts thereof. Thus, for instance, where it has been stated that the annular trough extends inwardly towards the shaft with its inner side wall spaced from the shaft by a clearance, such clearance would be the clearance between the said inner side wall and a lower locating sleeve for the inner race of the bearing in a case where such a sleeve is provided. Likewise, the outer side wall of the annular trough may be constituted by a lower locating sleeve for the outer race of the bearing.

In certain assemblies embodying the invention the lower part of the annular space between the tubular housing and the shaft below the bearing is substantially closed by a flange extending across the annular space from one of these members towards the other and spaced from the latter by a clearance of labyrinth form. In this way, leakage of gas downwardly out of the lower part of the annular space instead of upwardly through the aforementioned clearances below the bearing is substantially prevented.

In certain constructions it may also be desirable to prevent leakage of gas upwardly through the bearing and out of the upper part of the said annular space. In such a construction the annular space between the shaft and the housing above the bearing may be substantially closed by at least one flange extending from one of these members towards the other and spaced from the latter by a clearance of labyrinth form. Where there is a risk of unwanted oil or other liquid running down the shaft into the bearing from somewhere above the bearing assembly, there may be two such flanges above the bearing spaced apart in the vertical direction with an annular chamber between them, and means for causing a gas admitted to this annular chamber to leak downwardly through the labyrinth clearance of the lower of these two flanges into the annular space above the bearing and upwardly through the labyrinth clearance of the upper of these two flanges to prevent leakage down past this flange from above.

The gas may be admitted to the bearing assembly under pressure to ensure its passage through the various clearances in the desired direction. On the other hand, it would be permissible to admit the gas at atmospheric pressure if a sufficiently high degree of suction is available for drawing off the gas and oil from the trough.

Two embodiments of the invention as applied to a particular vertically mounted combustion turbine power unit for a helicopter will now be specifically described by way of example with reference to the accompanying somewhat diagrammatic drawings, in which:

Figure 1 shows the general arrangement of the combustion turbine power unit;

Figure 2 is a sectional view of the bearing supporting the compressor turbine of the power unit; and Figure 3 is a sectional view of the bearing supporting the power turbine of the power unit.

The combustion turbine power unit shown in Figure 1 comprises an axial flow compressor 10 connected through a shaft 11 with a compressor turbine 12 which provides the power for driving the compressor 10, several parallel combustion chambers 13 being disposed around the shaft 11 between the compressor 10 and the compressor turbine 12. Disposed above the compressor turbine 12 and mechanically independent thereof is a power turbine 14 which drives the helicopter rotor 17 through a shaft 15 and reduction gearing 16. The two turbines 12 and 14 are contained in a common turbine casing 18 which is mounted by supports 19 in the structure of the helicopter. The casing of the reduction gearing 16 is likewise mounted in the structure of the helicopter by supports 20. The compressor turbine 12 is supported in the housing 18 by a bearing 21, while the power turbine 14 is supported in this housing by a bearing 22. The turbine exhaust is discharged through outlets 23.

The power unit is disposed so that when the helicopter is in level flight the main axis of the power unit is vertical with the compressor 10 at the bottom. Owing to this vertical disposition of the power unit, there is a tendency for lubricating oil supplied to the bearings to run down the shafts which these bearings support. In order to prevent this the invention provides a special form of bearing assembly which is applied to both the bearings 21 and 22, which are shown on a larger scale in Figures 2 and 3, respectively.

The bearing assembly for the bearing 21 as shown in Figure 2 comprises a tubular housing 24 forming part of the turbine casing 18. The inner surface of the housing 24 is of circular cylindrical form, apart from an internal flange 25 at its lower end. The shaft 11 passes through the centre of the tubular housing 24 and has an external diameter such that there is provided between the tubular housing 24 and the part of the shaft which lies within it an annular space of substantial radial dimensions. Disposed in this annular space is the bearing 21, which is a ballbearing the outer race 26 of which is located in the tubular housing 24 while its inner race 27 is located on the shaft 11. The outer race 26 is located in the vertical direction by an upper outer locating sleeve 28 and a lower outer locating sleeve 29. Below the lower outer locating sleeve 29 is a trough member 30 and below this is another sleeve 31 termed herein the bottom sealing sleeve, which rests upon the flange 25. The upper end of the upper outer locating sleeve 28 is engaged by a collar 32 which is screwed into a corresponding screwthread in the tubular housing 24 to hold the parts 26, 28, 29, 30 and 31 clamped firmly together.

The inner race 27 of the bearing 21 is located by an upper inner locating sleeve 33 and a lower inner locating sleeve 34. The upper inner locating sleeve 33 directly engages the inner race 27 but the lower inner locating sleeve 34 is spaced from the inner race by the inner portion of an inverted cup member 35. Both the inner locating sleeves 33 and 34 are firmly secured to the shaft 11 to locate the inner race 27 in the vertical direction.

The inner side wall 37 of the trough member 30 extends upwardly from the inner edge of the base 36 of the trough member, thus providing a deep annular trough 38 below the bearing 21. The downwardly extending side wall 39 of the cup member 35 overlaps the inner side wall 37 of the trough member and is spaced from it by a small clearance. The surface of the upper part of the wall 37 which faces the shaft is provided with inwardly directed ridges 40 which lie very close to the lower inner locating sleeve 34 and provide a labyrinth seal. A similar labyrinth seal 41 is provided on the bottom sealing sleeve 31 adjacent the lower inner locating sleeve 34. Two similar labyrinth seals 42 and 43 are provided on two parallel flanges of the upper outer locating sleeve 28 adjacent the upper inner locating sleeve 33.

For lubricating the bearing 21 oil is pumped through a supply pipe 44 provided with a flow-constricting member 45 into a channel 46, from which it emerges through nozzles 47 above and below the bearing in the form of jets.

The tubular housing 24 is surrounded by an air-tight casing 48 in which are formed annular passages 49 and 50 extending round the bearing assembly and communicating with a common chamber 51 on one side of the bearing to which compressed air is admitted through a passage 52.

From the annular channel 49 the compressed air enters an annular chamber 53 between the two labyrinth seals 42 and 43 and leaks away upwardly through the upper seal 42 and downwardly through the lower seal 43 thereby preventing any leakage of oil upwardly or downwardly through these seals. From the annular passage 50 the compressed air enters an annular chamber 54 between the trough member 36 and the bottom sealing sleeve 31, from which chamber it can leak slowly downwards through the labyrinth seal 41 and upwards through the labyrinth seal 40. This air prevents any escape of oil from the trough 38 through the labyrinth seal 40. Both air and oil are present in the chamber 55 below the labyrinth seal 43 and in the trough 38, and may be in the form of a mist or froth. This oil/air mixture is drawn off from the trough 38 by a scavenge pump 100 through an aperture 56 into a chamber 57 and thence through a pipe 58. There is thus no possibility of oil supplied to the bearing 21 escaping down the shaft 11.

The bearing assembly which includes the bearing 22 for the power turbine 14 is shown in more detail in Figure 3. The outer race 60 of the bearing 22 is mounted in a tubular housing 61 forming part of the turbine casing 18 and is located in this housing between an upper outer locating sleeve 62 and a lower outer locating sleeve 63. The lower outer locating sleeve 63 rests on an inwardly directed flange 64 at the lower end of the tubular housing 61 while the upper outer locating sleeve 62 is clamped down by means of a collar 65 screwed into an internal screwthread in the tubular housing 61.

The inner race 66 of the bearing 22 is clamped on to the shaft 15 between a lower inner locating sleeve 67 and an upper inner locating sleeve 68.

Projecting inwardly from and integral with the lower outer locating sleeve 63 is an annular trough member 69 the inner side wall 70 of which is provided with inwardly directed projections 71 forming a labyrinth seal with the lower inner locating sleeve 67. The inner side wall 70 is also provided with outwardly directed projections 72 which form a labyrinth seal with the inner surface of the side wall 73 of an inverted cup member 74 fastened to the lower inner locating sleeve 67 just below the inner race 66.

Oil is supplied to the bearing through a pipe 75 provided with a constriction 76 and leading to a channel 77 and a chamber 78 provided with an oil supply nozzle 79 for squirting an oil jet against the underside of the bearing 22. A similar chamber at the top of the bearing enables oil to be squirted on to the top of the bearing through a nozzle 80. At one point in its circumference the upper outer locating sleeve 62 is provided with a passage 81 for a purpose to be described.

Compressed air is supplied through a passage (not shown) to a space 82 between the upper surface of the power turbine disc 14 and a lower wall assembly 83 below the bearing 22. Thus some air can leak outwardly across the turbine disc for cooling it, its escape into the turbine blade channels being controlled by a labyrinth seal 84, while some air can leak inwardly and upwardly through the labyrinth seals 71 and 72 into the annular trough 85 of the trough member 69 immediately below the bearing. In this trough there will be an oil/air mixture in the form of a mist or froth which is drawn off from the trough through the passages 86, 87 and 88 by a scavenge pump 101. Oil/air mist which may be present in the space 89 above the bearing 22 and surrounding the inner upper locating sleeve 68 will be drawn off through the said passage 81, and through further passages 90 and 91 into the passage 86. It is impossible for any appreciable amount of oil to escape down the shaft 15 on to the turbine disc 14.

To prevent excess pressure building up in the trough 85 which might hinder proper lubrication of the bearing, a by-pass passage 92 is provided leading from the interior of the inverted cup member 74 to a point above the bearing. This by-pass passage is conveniently formed by a groove in the shaft 15.

What we claim as our invention and desire to secure by Letters Patent is:

1. A bearing assembly which supports a shaft having a substantially vertical axis, comprising a tubular bearing housing through which said shaft passes leaving an annular space between said shaft and said housing, a bearing having an outer race and an inner race in said annular space, means locating said outer race in said housing, means locating said inner race on said shaft, an annular trough member attached to said housing below said bearing and extending inwardly towards said shaft, an upwardly extending inner side wall on said annular trough member spaced from said shaft by a clearance, an inverted cup member attached to said shaft below said bearing, a downwardly extending side wall on said inverted cup member overlapping said inner side wall of said trough member with a clearance between said side walls, said trough member and said inverted cup member together dividing said annular space below said bearing into an upper part and a lower part, said clearances providing the only communication between said upper part and said lower part, means for delivering oil to said bearing from above, and scavenge pump means connected to said upper part of said annular space to draw gas from said lower part of said annular space into said upper part thereof through said clearances in series at least one of said clearances being of such small radial dimension that oil and gas cannot flow through it simultaneously in opposite directions.

2. A bearing assembly according to claim 1 in which said gas is at superatmospheric pressure.

3. A bearing assembly according to claim 1 in which at least one of said clearances is of labyrinth form.

4. A bearing assembly according to claim 1 in which said means locating said outer race in said housing includes a sleeve fixed in said housing and constituting an outer side wall of said annular trough member.

5. A bearing assembly according to claim 1 which includes an annular flange extending across said annular space between said tubular housing and said shaft below said trough member and said inverted cup member, said flange being attached to said tubular housing and spaced from said shaft by a clearance of labyrinth form and substantially closing said lower part of said annular space.

6. A bearing assembly according to claim 1 which includes at least one annular flange extending across said annular space between said tubular housing and said shaft above said bearing said flange being attached to said tubular housing and spaced from said shaft by a clarance of labyrinth form and substantially closing said annular space above said bearing.

7. A bearing assembly according to claim 6 in which there are two of said annular flanges above said bearing spaced apart in the vertical direction with an annular chamber between them, and means for introducing a gas into said annular chamber to leak downwardly through the labyrinth clearance between the lower of said two flanges and said shaft into said annular space above said bearing and upwardly through the labyrinth clearance between the upper of said two flanges and said shaft.

8. A bearing assembly according to claim 7 in which said gas introduced into said annular chamber is at superatmospheric pressure.

9. A bearing assembly as defined in claim 1, in which said annular trough member is fixedly attached to said housing and said inverted cup member is fixedly attached to said shaft, whereby the relative positions of said trough member and said cup will be determined by said respective bearing races.

References Cited in the file of this patent
UNITED STATES PATENTS

| | | |
|---|---|---|
| 2,063,673 | Haley | Dec. 8, 1936 |
| 2,266,107 | Waterfill | Dec. 16, 1941 |